Patented Mar. 15, 1932

1,849,844

UNITED STATES PATENT OFFICE

STEWART JOSEPH LLOYD, OF UNIVERSITY, AND ABSALOM MASON KENNEDY, OF MONTGOMERY, ALABAMA

METHOD FOR HYDROLYZING THE HALIDES OF HYDROCARBONS AND THEIR DERIVATIVES

No Drawing.  Application filed February 6, 1926. Serial No. 86,648.

In application #17,429 of March 21, 1925, we have described a method for producing carbolic acid from chlorbenzol by sending the latter, in the vapor phase, together with steam, through a heated, porous, chemically resistant material which acts as a catalyst and have found that by this method other useful substances may be readily prepared.

An object of this invention is the production of hydroxides, aldehydes, ketones, acid halides and acids of the hydrocarbons and their derivatives such as methanol, alcohol, ethylene glycol, glycerine, hydroquinone, pyrogallic acid, cresols, formaldehyde, acetone, acetyl chloride, benzoic acid, etc., from the halides of the hydrocarbons and their derivatives of the saturated, unsaturated, aromatic and other series by sending these halides in the vapor phase, together with steam, over a substance heated to a temperature at which it acts as a catalyst, whereby a halogen acid is formed together with either an hydrocarbon hydroxide, aldehyde, ketone, acid halide, acid, etc.

These substances, as at present produced, are usually made by separating them from natural products or from the mixed products of certain chemical or bacteriological processes and such reparations are usually difficult, tedious and costly and thereby add to the production cost of the substances. For example, methanol occurs, along with a number of other substances, in the products formed by heating wood in closed containers; while alcohol occurs, along with numerous other substances, in the product of the fermentation of sugars, these being separated from the remainder of the substances in the products containing them by distillation, the production of pure alcohols requiring this process to be oft repeated. A further object of this invention is the production of these hydroxides, aldehydes, ketones, acid halides, acids, etc., synthetically from the corresponding hydrocarbons in a more nearly pure form and mixed with fewer foreign substances so that their separation is less difficult and costly.

It is well known that one or more of the hydrogen atoms of the hydrocarbons may be replaced by halides. For example, by familiar methods, one or more of the hydrogen atoms of methane ($CH_4$) may be substituted or replaced by chlorine to form $CH_3Cl$, $CH_2Cl_2$, $CHCl_3$, etc., and, in the unsaturated series, the halides are readily formed by addition by reactions which may be expressed as follows:

$$C_2H_4 + Cl_2 \rightarrow C_2H_4Cl_2$$
$$C_2H_2 + Cl_2 \rightarrow C_2H_2Cl_2$$

and, in addition to the monohalogen compounds of the aromatic series as expressed in application #17,429, above mentioned, polyhalogen compounds such as dichlorbenzol ($C_6H_4Cl_2$), trichlorbenzol ($C_6H_3Cl_3$) and halogen addition products such as cyclohexylchloride ($C_6H_6Cl_6$) are known as are halogen products of many of the hydrocarbon derivatives such as chlornitrobenzol ($C_6H_4ClNO_2$), chloraniline ($C_6H_4ClNH_2$), chloracetic acid ($CH_2Cl\cdot COOH$) etc.

We have found that when one of these halogenated compounds in the vapor phase, together with steam, is sent through a substance heated to a temperature at which it functions as a catalyst, the halogen is replaced by an hydroxyl radical thereby forming an hydrocarbon hydroxide, aldehyde, ketone, etc., according to the manner in which the halogen atoms occur in the compound.

The following examples will serve to illustrate the manner of this substitution of the halide by an hydroxyl radical, which substitution may occur wholly or in part.

When a hydrocarbon monohalide is sent, together with steam, over a heated catalyst, an alcohol is formed. For example, with methyl chloride, methanol, a saturated alcohol is produced:

$$CH_3Cl + H_2O \rightarrow CH_3OH + HCl$$

while from allyl chloride, allyl, one of the unstaturated alcohols is formed:

$$CH_2{:}CH\cdot CH_2Cl + H_2O \rightarrow CH_2{:}CH\cdot CH_2OH + HCl$$

and in the same manner benzyl chloride yields benzyl alcohol:

$$C_6H_5\cdot CH_2Cl + H_2O \rightarrow C_6H_5\cdot CH_2OH + HCl.$$

When a hydrocarbon dihalide, in which only one halogen atom is attached to one carbon, is treated in the same manner, a dihydric alcohol or glycol is formed. For example, with ethylene chloride, ethylene glycol is produced:

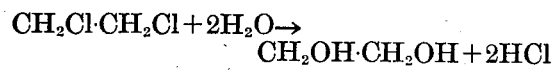

while from dichlorbenzene, pyrocatechin, resorcin or hydroquinone is formed according as the ortho, meta or para compound is used:

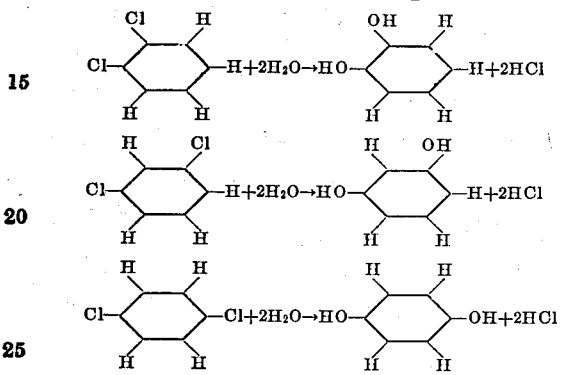

When a hydrocarbon dihalide, in which two halide atoms and a hydrogen atom are grouped about a single carbon atom, is used, an aldehyde is formed:

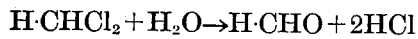

and when the compound contains a carbon atom to which two halide atoms only are attached, a ketone is produced. When dichlorpropane is hydrolyzed in this manner, acetone is produced:

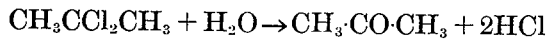

When a hydrocarbon trihalide, in which only one halogen atom is attached to one carbon, is passed, in the vapor phase, together with steam, through a heated catalyst, a trihydric alcohol is formed. For example, from symmetrical trichlorpropane, glycerine is formed:

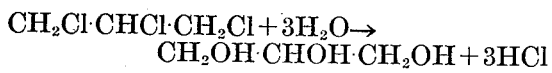

and with 1:2:3 trichlorbenzene, pyrogallic acid is formed:

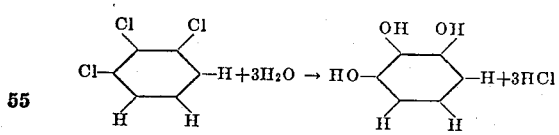

and with 1:3:5 trichlorbenzene, phloroglucinol is formed:

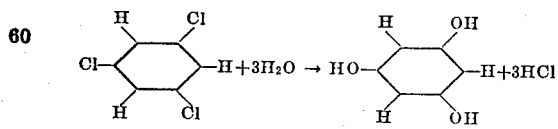

and in the same manner other polyhydric alcohols are produced.

When a trihalide, in which three halogens are attached to a single carbon atom is passed in the vapor phase, together with a limited quantity of steam, through a heated catalyst, an acid halide is formed. For example, from alpha trichlormethane, acetyl chloride is produced:

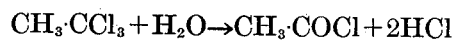

while if a greater quantity of steam is used, an acid is produced:

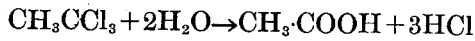

In the same manner, from benzyl trichloride, benzoic acid is produced:

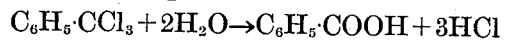

The halide of a hydrocarbon derivative when sent, in the vapor phase together with steam, through a heated catalyst, will be hydrolyzed in the same manner as the corresponding hydrocarbon halide. For example, chlornitrobenzene, acted on in this manner produces nitrophenol:

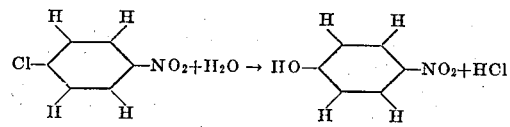

By suitable arrangement, including the use of a quantity of steam limited to the approximate amount stoichiometrically corresponding to the amount of halogen to be removed, only a part of the halide radicals are substituted by hydroxyl radicals. For example, from dichlorbenzene, chlorphenol may be produced:

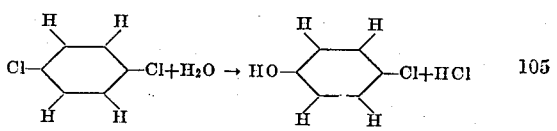

These reactions are not ordinarily completed in a single passage of the hydrocarbon halide through the apparatus and the amount of the hydroxide, aldehyde, ketone, acid halide, or acid produced seems to depend on the length of time the vapors are exposed to the heated catalyst. The unaltered hydrocarbon halide may usually be readily separated and again sent through the catalyst for more complete conversion.

We have found that the amount of steam used may vary considerably from the theoretical amount indicated, as of 18 parts of $H_2O$ to 52.5 parts of $CH_3Cl$, without seriously affecting the reaction or the product. In fact it appears that an excess of steam produces greater yield than the equivalent proportion. We have found also that the yield may be increased by occasionally cutting off the supply of the halide and in this manner sweeping out the catalyst with steam.

The most advantageous temperature to use in the production of the hydrocarbon halides, aldehydes, ketones, acid halides or acids by this method will depend on the particular hydrocarbon halide which is being hydrolyzed, on the catalyst used, on the proportion of steam to the hydrocarbon halide and on the length of the furnace. In no case have we found it necessary or desirable to operate at a temperature higher than 850° C.

These reactions may be most conveniently carried out at atmospheric pressure but we have found that increased pressure does no harm. It is essential however that to obtain this reaction at atmospheric pressure, the halogen compound and the water, in the presence of the heated catalyst, must be in the vapor phase.

We have found that the chemical composition of the catalyst used appears to be of less importance than its physical structure. For example, we have used bauxite, porous silica, brucite, magnesite, the oxides of zinc, thorium, titanium, etc., with approximately equal results and have found that the best results are obtained when the structure of the catalyst is such as to expose a maximum of surface to the gases passing through it.

We are aware that the hydrocarbon halides have been previously hydrolyzed by bringing them into contact with water (Bernthsen "Text-book of organic chemistry", 1912 ed. pp. 71, 123, 132, 190 etc.). When carried out in this manner, these reactions take place so slowly that they are not used in commercial operations. We are also aware that the hydrocarbon halides have been hydrolyzed by bringing them into contact with the hydroxides of the alkali metals or of the alkali earth metals; (United States Patent #1,549,779 to MacMullin and Gegenheimer). When carried out in this manner, the alkali metal hydroxide or alkali earth hydroxide does not act as a catalyst but takes part in the reaction which may be represented by the following as an example:

$2CH_3Cl + Ca(OH)_2 \rightarrow 2CH_3OH + CaCl_2$

As a typical means for carrying out this process using the production of hydroquinone as an example, we prefer to operate as follows:

Steam is passed through a closed vessel containing paradichlorbenzol which is heated to such a temperature that the weight of the respective vapors has a ratio of from 72 to 100 parts of water to 147 parts of the dichlorbenzol. These mixed vapors are then passed through a furnace containing a catalyst, such as porous silica heated to a temperature of about 550° C.

The products of the furnace, consisting of hydroquinone, hydrochloric acid, chlorphenol, unaltered paradichlorbenzol and water are cooled to a temperature of 200–240° when the hydroquinone will separate out and may be collected. The gases are then sent to a second vessel and cooled to 110–125° when the unaltered chlorbenzol will be condensed and may be collected. The mixed vapors of hydrochloric acid and water are further cooled and collected as dilute hydrochloric acid and the recovered paradichlorbenzol is again sent through the catalyst for further conversion.

In the example given, only the chlorides have been mentioned as halides. We have used the bromides and iodides of many of the hydrocarbons and have obtained the corresponding hydroxides, aldehydes, ketones, acid halides and acids but we prefer to use the chlorides as they are generally more economical and more stable than the other halides.

What we claim is:

1. The method of producing alcohols, hydrocarbon hydroxides, aldehydes, ketones and acid halides, from halides of hydrocarbons which consists in passing, such a halide in the vapor phase, together with steam, through a porous dioxide of the silicon family heated to a temperature of approximately 550° C. to convert same into a catalyst.

2. The method of hydrolyzing the halides of hydrocarbons by the interaction therewith with steam, which consists in passing the mixed vapors through a catalyst composed of a porous dioxide of the silicon family heated to a temperature of from 550° to 850° C.

3. The method of producing hydrolyzed hydrocarbons from halides of the same, which consists in passing the vapors of said halides together with steam through a catalyst composed of a porous dioxide of the silicon family heated to a temperature of from 550° to 850° C.

4. The method of hydrolyzing the polyhalides of the hydrocarbons which consists in sending the vapors of the polyhalide to be hydrolyzed, together with steam through a porous dioxide of the silicon family heated to a temperature of from 550° to 850° C. at which it functions as a catalyst.

5. The method of partially hydrolyzing the polyhalides of the hydrocarbons which consists in passing the vapors of the polyhalide, together with steam limited in quantity to the approximate amount stoichiometrically corresponding to the amount of halogen to be removed through a porous dioxide of the silicon family heated to a temperature of from 550° to 850° C. at which it functions as a catalyst.

STEWART JOSEPH LLOYD.
ABSALOM MASON KENNEDY.